Aug. 18, 1964 T. E. BJORN 3,144,774
VIBRATION DETECTION APPARATUS
Filed Feb. 14, 1961
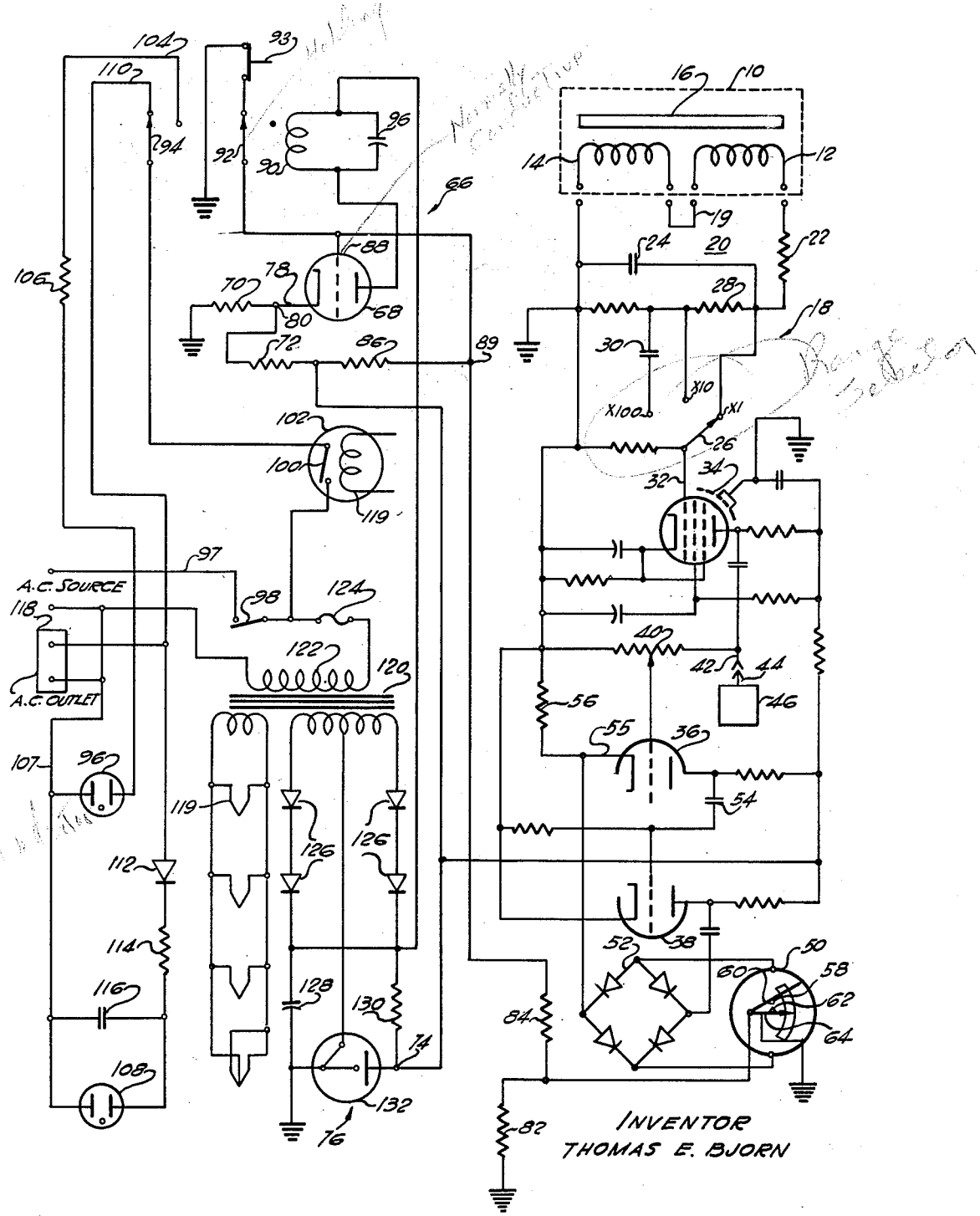
INVENTOR
THOMAS E. BJORN
By William J. Newman
ATTORNEY

United States Patent Office 3,144,774
Patented Aug. 18, 1964

3,144,774
VIBRATION DETECTION APPARATUS
Thomas E. Bjorn, Waukegan, Ill., assignor to Stewart-Warner Corporation, Chicago, Ill., a corporation of Virginia
Filed Feb. 14, 1961, Ser. No. 89,235
5 Claims. (Cl. 73—466)

This invention relates generally to balance testing of rotating mechanisms and more particularly to the detection of vibrational forces in industrial machinery or the like due to excessive degrees of unbalance.

In recent times machinery, especially that of the industrial type, has become extremely complex and correspondingly expensive. Because the products which they produce require great accuracy and because of the extended utilization of automatic control to operate the machines, closer tolerance operation has become an increasingly important requirement. It is well known that vibrational forces due to unbalance of rotating bodies within the machinery may well lead to serious inaccuracies in their operation which reduce their effectiveness in producing acceptable end products. Also, the vibrational forces due to unbalance of rotating bodies within the machinery may well lead to serious inaccuracies in their operation which reduce their effectiveness in producing acceptable end products. Also, the vibrational forces, if permitted to remain, have a tendency to increase in intensity and may approach a dangerous level leading to serious damage of the machinery. It would therefore be advantageous to constantly monitor the machinery during its operation to detect serious level vibrational forces which may arise through constant use of the machinery. It is this end, namely the monitoring of machinery to detect the presence of unwanted vibrational forces caused by unbalance of rotational forces, to which this invention is directed.

It is also an object of this invention to provide a device for monitoring unbalance in a rotating mechanism which is simple but accurate and relatively inexpensive.

A further object of this invention is to provide a device for monitoring unbalance in a rotating mechanism which gives an alarm when a predetermined level of unbalance exists as well as a continuous reading, at all times, of the unbalance vibrational forces present in the machine.

It is another object of this invention to provide a device which may be used not only for the continuous monitoring of vibrational forces in a rotating mechanism, but also, with the aid of standardized additional apparatus, for performing balancing operations on the mechanism to reduce the vibrational forces.

Other objects and advantages of this invention will be evident upon a further reading of this specification especially taken in view of the accompanying drawing which is a schematic circuit diagram of apparatus representing a preferred embodiment of this invention.

The preferred embodiment of the present invention includes a pickup unit which is normally positioned in a convenient location on the particular machinery which it is desired to monitor. The pickup comprises a vibrating reed having a permanent magnet at the free end thereof and a pair of coils within which the magnet oscillates. The oscillation of the magnet within the coils produces an A.C. voltage proportional to the intensity of vibration detected. The electric signal output of the pickup is suitably amplified and applied to a meter relay which has an indicator for reading the amplitude of the vibration and a set of contacts which are operable at a predetermined amplitude level of the vibrations. The meter relay contacts are connected to a high impedance input switching circuit which is operable to give a visual and/or audible warning that a predetermined level of vibration is present in the monitored machinery. Also provided in the device are means for connecting a stroboscopic lamp unit which may be used together with a portion of the monitoring apparatus to perform a balancing operation on the monitoring machinery.

More particularly, the monitoring device comprises a pickup unit 10 substantially of the type disclosed in copending application, T. E. Bjorn et al., Serial No. 767,921, Patent No. 3,071,007, filed October 17, 1958. Basically, the pickup unit 10 comprises a pair of axially aligned coils 12 and 14 within which are developed electric signals responsive to the vibratory motion of a permanent magnet 16 mounted on a tunable flexible reed (not shown). The reed and magnet are adjusted to vibrate in response to vibrational forces in the monitored machinery at the normal operating speed of the machinery. The pickup unit 10 is a separate component which is adapted to be bracketed to the monitored machinery and is connectable to a second component 18 comprising the electrical circuitry by appropriate cable and jack-plug means.

Within the component 18 is a jumper 19 which serially connects the two coils 12 and 14 in the pickup unit 10. The output of the pickup unit 10 appearing across the serially connected coils 12 and 14 is applied to a low pass filter 20 comprised of a resistor 22 and capacitor 24. It is desirable that the voltage signal passing through the device is affected only by the amplitude of vibration of the magnet 16 in the pickup unit 10 and is insensitive to the changing velocity and acceleration components which are naturally present in an electromagnetic signal generating device such as the pickup unit 10. The low pass filter 20 compensates for the changes in amplitude of the signal caused by changes in the velocity and acceleration of the magnet at different frequencies by attenuating the signal at higher frequencies where the velocity and acceleration effects are greatest. There is thus provided a linear output corresponding to amplitude of vibrations of the permanent magnet alone over an extended frequency range.

The signal is then passed through a range selector 26, the purpose of which is to attenuate the signal an appropriate amount to provide a suitable signal level in the subsequent circuits. The range selector 26 comprises a rotary switch which in the X1 position connects the output of the low pass filter 20 directly to the next stage; in the X10 position connects the output of the low pass filter 20 through a dropping resistor 28 to the next stage; and in the X100 position connects the output of the low pass filter through the dropping resistor 28 and a capacitor 30 to the next stage. The capacitor 30, in effect, detunes the resonant circuit comprising the coils 12 and 14 in the pickup unit and the capacitor 24. This has a damping effect on the vibrating magnet so as to limit the amplitude of the oscillations of the vibrating magnet. As described in the referenced copending application, severe vibrations may cause the magnet to mechanically engage the coil structure within the pickup unit and cause distortions of the output signal which will affect the operation of the device.

The signal from the range selector 26 is applied to the grid 32 of a pentode 34 forming the input of a cascaded amplifier comprising, in addition, the two triode units 36 and 38 of a dual-triode vacuum tube. The connecting circuit between the output of the pentode 34 and the first triode unit 36 includes a potentiometer 40 which serves as a calibrating control for the monitoring device. There is also a jack 42 in the connecting circuitry between the output of the pentode 34 and the potentiometer 40 which is adapted to receive a plug 44 associated with a stroboscopic lamp unit 46 for performing balancing operations as will be hereinafter described.

A meter relay 50 is connected across the output of a bridge-type rectifier 52 in the output circuit of the triode section 38. The input to the rectifier circuit 52 is connected at one end through a blocking capacitor 54 to the plate circuit of the second triode unit 38, and at the other end to the cathode 55 of the first triode unit 36 which is connected to ground potential through a resistor 56. This particular connection of the input to the meter relay circuit is employed to provide negative feedback to the amplifier stages to increase stability and reduce distortion in the circuit.

The meter relay 50 comprises essentially a D'Arsonval meter movement having a contact point 58 attached to the pointer 60 operated by the meter movement and a second contact point 62 attached to a manually operable pointer 64. The contacts 58 and 62 are makable when the signal operated pointer 60 reaches the preselected setting of the manually operated indicator 64 to operate an alarm circuit 66 as hereinafter described.

The alarm circuit 66 includes a triode 68 which acts as a high impedance electronic switch. The control bias levels for the triode 68 are provided by a pair of voltage divider circuits. The first circuit comprises series connected resistors 70 and 72 between ground and voltage regulated output 74 on power supply 76. The cathode 78 of the triode 68 is connected to the first voltage divider circuit at junction 80 between the series connected resistors 70 and 72. The second voltage divider circuit comprises series connected resistors 82, 84 and 86 between ground and the voltage regulated power supply output 74 and is connected to the grid 88 of triode 68 at junction 89 between resistors 84 and 86. The voltage divider circuits provide a fixed bias level between the grid and cathode of the triode 68 to maintain it in a highly conducting state during normal operation with little or no unbalance in the monitored apparatus.

The meter relay contacts 58 and 62 are so arranged to shunt the resistor 82 in the grid bias voltage divider circuit when the amplitude indicator 60 indicates the predetermined level of vibration. The shunting of resistor 82 causes the bias level between the cathode 78 and grid 88 to drop to a negative value and cut off conduction of the triode 68.

A switching relay 90 connected in the plate circuit of the triode 68 is energizable when the triode is in its conducting state. It has a first set of contacts 92 which are operable as a part of a holding circuit to maintain the triode 68 at cutoff after the meter relay contacts have closed. The contacts 92 are normally closed so that during normal operation of the monitor, when the triode 68 is in its highly conductive state, relay 90 is energized and contacts 92 in the holding circuit are open. When the triode 68 is cut off by the closure of the meter relay contacts, however, contacts 92 return to their closed condition to connect the grid 88 directly to ground, thereby maintaining the triode in its cutoff condition even if the meter relay contacts subsequently open. Manually operable contacts 93 serve as a reset to restore the circuit for proper operation after an unbalance condition has been detected. The contacts 93 break the mold circuit including the relay contacts 92 which maintains the triode 68 in its cut-off state. The direct ground connection to the grid 88 of triode 68 is broken thus restoring it to its heavily conducting state in preparation for again monitoring the presence of unbalance vibration. A capacitor 96 shunts the relay 90 and acts as a time delay. It prevents the deenergization of the relay responsive to spurious signals in the amplifying circuits causing momentary closure of the meter relay contacts.

The relay 90 has a set of make-break contacts 94 which are included in a circuit to energize the various warning devices. When the monitoring device is in its normally operating condition and an abnormal vibration is not present, the contacts 94 are in their right-hand position as shown in the figure to complete a circuit for an amber colored neon lamp 96 across the A.C. source comprising lead 97, a power switch 98, contacts 100 in a delay relay 102, contacts 94, conductor 104, resistor 106, neon lamp 96 and lead 107. However, when the monitoring device detects an abnormal vibration and relay 90 is deenergized due to the cutoff of triode 68, contacts 94 fall back to their normally closed position to complete a circuit for a red neon lamp 108 comprising lead 97, power switch 98, delay relay contacts 100, switching relay contacts 94, conductor 110, silicon diode rectifier 112, resistor 114, neon lamp 108 and lead 107. A capacitor 116 parallels the neon lamp 108 and cooperates with the rectifier 112 and resistor 114 to form a relaxation oscillator to cause the red neon light 108 to flash on and off.

An A.C. outlet 118 is connected between leads 110 and 107. This outlet may be used to energize other warning devices which may be necessary. It may be seen that the operation of contacts 94 to their normally closed condition also opens the circuit for the amber neon light 96.

The time delay relay 102 is required in the circuit because of the fail safe design of the monitoring device. It will be recalled that during normal operation, with no appreciable vibration being detected, the triode 68 is conducting and relay 90 is energized to light the amber lamp 96. The circuit is fail safe in that, if the triode 68 is rendered nonconductive for any reason at all, the switching relay 90 will release to energize the warning lamp 108 and any other indicators which may be connected to the A.C. outlet 118. The time delay relay 102 prevents the alarms from being energized when the device is first turned on by the closure of power switch 98. If not for the time delay relay 102 the alarm circuits would be completed immediately with the closure of power switch 98 since contacts 94 are normally connected to the circuit including the alarm devices. The contacts 100 are thermostatically operated by means of a heater filament 119 which delays their closure for approximately 15 seconds after the power switch 98 is closed.

The power supply 76 for the vibration monitor is a standard type comprising a power transformer 120 having its primary 122 connected across the A.C. source through a fuse 124 and power switch 98. One secondary winding circuit of the power transformer 120 comprises the ordinary rectifiers 126, capacitor 128, and resistor 130 in standard full wave rectifier and filter circuit connections. It also comprises a voltage regulator tube 132 to provide the constant level biasing voltages for the switching triode 68. The other secondary winding circuit energizes the tube filaments as well as the filament 119 for the time delay relay 102.

The jack 42 at the output of the amplifier pentode 34 provides a convenient means for carrying out a balancing operation when the alarms have indicated undue vibration forces present in the machine. A unit 46 including a stroboscopic light and appropriate circuitry may be connected by the jack 44 to the monitor and the signal from the output of the amplifier may be used to trigger the strobe light to determine the locus of the unbalance. With the aid of the amplitude readings of the indicator 60 on the meter relay 50 the machine may be balanced according to the procedures disclosed in the above referenced copending application. This arrangement permits a service technician to balance all monitored machines carrying with him just a single strobe unit which he merely plugs into a jack in the monitor unit. Timely setups for reading the amount of unbalance and performing balancing operations are eliminated which will ultimately pay for the cost of the monitor units.

While there has been described herein a preferred embodiment of this invention it may be seen that many modifications and changes may be made thereto without deviating from the basic inventive concepts. It is therefore intended that this invention should be limited only by the scope of the appended claims.

What is claimed is:

1. Apparatus for detecting unbalance in a rotary mechanism comprising electromagnetic means for producing a fluctuating electrc signal responsive to vibration caused by unbalance in the rotating mechanism, a low pass filter network connected to said signal producing means for compensating for that portion of the signal amplitude caused by response to the frequency of said signal producing means, means for selectively attenuating the output of said signal producing means including means for detuning said signal producing means at the highest amplitude signals, amplifying means including negative feedback connected to said attenuating means, an amplitude meter connected to the output of the amplifying means operable by the signal for indicating the amplitude of unbalance, a vacuum tube series connected with a switching relay to energize same upon conduction of said tube, a voltage divider network connected to the grid and cathode of said vacuum tube to provide a high impedance input thereto and to bias said tube to a high conductive state, a set of contacts forming a part of the movement of said amplitude meter and operable responsive to a preselected signal amplitude for shunting a portion of said voltage divider network to bias said tube to cutoff, a second set of contacts associated with said switching relay for holding said tube at cutoff, a third set of contacts associated with said switching relay and operable responsive to the cutoff condition of said tube, and alarm means energizable by said third set of contacts for warning of a predetermined level of vibration.

2. Apparatus for detecting unbalance in a rotary mechanism comprising electromagnetic means for producing a fluctuating electric signal responsive to vibration caused by an unbalance in the rotating mechanism, a low pass filter network connected to said signal producing means for compensating for that portion of the signal amplitude caused by response to the frequency of said signal producing means, means for selectively attenuating the output of said signal producing means including means for detuning said signal producing means at the highest amplitude signals, amplifying means including negative feedback connected to said attenuating means, an amplitude meter connected to the output of the amplifying means operable by the signal for indicating the amplitude of unbalance, a vacuum tube series connected with a switching relay to energize same upon conduction of said tube, a voltage divider network connected to the grid and cathode of said vacuum tube to provide a high impedance input thereto and to bias said tube to a high conductive state, a set of contacts forming a part of the movement of said amplitude meter and operable responsive to a preselected signal amplitude for shunting a portion of said voltage divider network to bias said tube to cutoff, a second set of contacts associated with said switching relay for holding said tube at cutoff, a third set of contacts associated with said switching relay and operable responsive to the cutoff condition of said tube, alarm means energizable by said third set of contacts for warning of a predetermined level of vibration, and stroboscopic means selectively connectable to and energizable by said amplifying means for determining the locus of the unbalance.

3. Apparatus for detecting unbalance in a rotating mechanism comprising means for producing a fluctuating electric signal responsive to the vibrational forces caused by an unbalance in the rotating mechanism, signal producing means, means for selectively attenuating the output of said signal producing means, amplifying means connected to said attenuating means, an amplitude meter connected to the output of the amplifying means operable by the signal for indicating the amplitude of unbalance, a high impedance input switching circuit comprising a vacuum tube normally biased to high conduction in series connection with a switching relay, a set of adjustable contacts connected to the input of said switching circuit and operable at a preselected indication of said amplitude meter for biasing said vacuum tube to cutoff, a second set of contacts associated with said switch relay, and alarm means responsive to the operation of said second set of contacts for warning of a predetermined level of unbalance.

4. Apparatus for detecting unbalance in a rotating mechanism comprising means for producing a fluctuating electric signal responsive to vibrational forces caused by an unbalance in the rotating mechanism; electric meter means operative responsive to the receipt of said fluctuating signal for reading the magnitude of the unbalance and comprising contact means operable responsive to a predetermined magnitude of the unbalance; alarm means; means for connecting said alarm means to a line source comprising a high impedance input electronic switch operable responsive to said contact means and a relay operable responsive to said electronic switch; and stroboscopic means selectively energizable responsive to said fluctuating electric signal for determining the locus of the unbalance.

5. Apparatus for detecting unbalance in a rotating mechanism comprising means for producing a fluctuating electric signal responsive to vibrational forces caused by an unbalance in the rotating mechanism; electric meter means operative responsive to the receipt of said fluctuating signal for reading the magnitude of the unbalance and comprising contact means operable responsive to a predetermined magnitude of the unbalance; alarm means; and means for connecting said alarm means to a line source comprising a high impedance input electronic switch operable responsive to said contact means and a relay operable responsive to said electronic switch.

References Cited in the file of this patent

UNITED STATES PATENTS

| | | |
|---|---|---|
| 1,643,759 | Adams | Sept. 27, 1927 |
| 2,799,015 | Bell | July 9, 1957 |
| 2,832,915 | McCoy | Apr. 29, 1958 |
| 2,891,241 | Fibikar | June 16, 1959 |
| 2,942,247 | Lienau et al. | June 21, 1960 |
| 2,974,521 | Phelps | Mar. 14, 1961 |